(12) United States Patent
Yang et al.

(10) Patent No.: US 6,668,619 B2
(45) Date of Patent: Dec. 30, 2003

(54) PATTERN MATCHING FOR REAL TIME LEAK DETECTION AND LOCATION IN PIPELINES

(75) Inventors: Bao-Wen Yang, Closter, NJ (US); Marion Recane, Cypress, TX (US)

(73) Assignee: Acoustic Systems, Inc., Houston, TX (US)

( * ) Notice: Subject to any disclaimer, the term of this patent is extended or adjusted under 35 U.S.C. 154(b) by 0 days.

(21) Appl. No.: 10/146,745

(22) Filed: May 15, 2002

(65) Prior Publication Data

US 2002/0124633 A1 Sep. 12, 2002

Related U.S. Application Data

(63) Continuation of application No. 09/320,875, filed on May 27, 1999, now Pat. No. 6,389,881.

(51) Int. Cl.[7] .................................................. G01M 3/04
(52) U.S. Cl. .................................. 73/40.5 R; 73/40.5 A
(58) Field of Search ...................... 73/40.5 R, 40.5 A, 73/570, 587, 592, 597; 702/51; 340/611

(56) References Cited

U.S. PATENT DOCUMENTS

| | | | |
|---|---|---|---|
| 3,760,280 A | 9/1973 | Covington | 326/55 |
| 3,814,207 A | 6/1974 | Kusuda et al. | 181/0.5 |
| 3,903,729 A | 9/1975 | Covington | 73/40.5 |
| 3,930,556 A | 1/1976 | Kusuda et al. | 181/0.5 |
| 4,091,658 A * | 5/1978 | Covington et al. | 73/40.5 R |
| 4,455,863 A | 6/1984 | Huebler et al. | 73/40.5 |
| 4,858,462 A | 8/1989 | Coulter et al. | 73/40.5 |
| 4,995,267 A | 2/1991 | Mikheev et al. | 73/800 |
| 5,101,774 A | 4/1992 | Marziale et al. | 122/504.2 |

(List continued on next page.)

OTHER PUBLICATIONS

Loth et al., Technology Assessment of On–Line Acoustic Monitoring for Leaks/Infringements in Underground Natural Gas Transmission Lines, West Virginia University, Jan. 5, 2003.*

*Primary Examiner*—Helen Kwok
*Assistant Examiner*—Charles Garber
(74) *Attorney, Agent, or Firm*—Wolff & Samson PC

(57) ABSTRACT

A method and apparatus is provided for detecting and locating leaks in a pipeline. Pattern match filtering is used to reduce false alarm rate, increase sensitivity and improve leak location accuracy, while quickly detecting leaks by the acoustic signal generated from a leak event in pipelines containing gas or liquid under pressure. The pattern match filter technique detects a pressure wave generated by a leak, but discriminates against background noise and pressure disturbance generated by other non-leak sources that might otherwise be detected as a leak. The pattern match filter derives a sharp peaked output from the signal of the expansion wave which allows for a distinctive point of reference for a time stamp. This provides for improved accuracy in leak location calculations. The pattern match filter is incorporated into site processors located at multiple points along a pipeline, and at a central node processor which receives data from all site processors. The pattern match filter includes using previously recorded leak profiles. At site processes located at multiple points along a pipeline, a series of previously recorded signature leak profiles are continuously compared in real time against pipeline pressure signals. Data from each site processor are used collectively at a node processor and compared against multiple leak profiles to provide further false alarm rejection. The leak event data generated at each site processor is used by the node processor to declare a leak. By the application of this pattern match filter technique, the signal to noise ratio (S/N ratio) required to identify a leak event is reduced and the sensitivity of leak detection is increased.

10 Claims, 6 Drawing Sheets

U.S. PATENT DOCUMENTS

| | | | | |
|---|---|---|---|---|
| 5,201,212 A | | 4/1993 | Williams Barry N. | 73/40.5 |
| 5,257,545 A | | 11/1993 | Au-Yang | 73/597 |
| 5,272,646 A | | 12/1993 | Farmer | 364/509 |
| 5,388,445 A | | 2/1995 | Walters et al. | 73/40.5 |
| 5,416,724 A | * | 5/1995 | Savic | 364/509 |
| 5,418,367 A | | 5/1995 | Imaeda | 250/339.12 |
| 5,428,989 A | | 7/1995 | Jerde et al. | 73/40.5 |
| 5,531,099 A | | 7/1996 | Russo | 73/40.5 |
| 5,548,530 A | | 8/1996 | Baumoel | 364/509 |
| 5,625,150 A | * | 4/1997 | Greene et al. | 73/649 |
| 5,650,943 A | * | 7/1997 | Powell et al. | 364/550 |
| 5,708,195 A | | 1/1998 | Kurisu et al. | 73/40.5 |
| 5,798,459 A | | 8/1998 | Ohba et al. | 73/587 |
| 5,922,942 A | * | 7/1999 | Roy | 73/40.5 R |
| 5,974,862 A | | 11/1999 | Lander et al. | 73/40.5 |
| 5,987,990 A | | 11/1999 | Worthington et al. | 73/592 |
| 6,138,512 A | * | 10/2000 | Roberts et al. | 73/570 |
| 6,389,881 B1 | * | 5/2002 | Yang et al. | 73/40.5 A |
| 6,530,263 B1 | * | 3/2003 | Chana | 73/40.5 R |

\* cited by examiner

PATTERN MATCHING FOR REAL TIME LEAK DETECTION AND LOCATION IN PIPELINES

RELATED APPLICATIONS

This is a continuation application of U.S. patent application Ser. No. 09/320,875 filed May 27, 1999, now U.S. Pat. No. 6,389,881 issued May 21, 2002, the entire disclosure of which is expressly incorporated herein by reference.

BACKGROUND OF THE INVENTION

1. Field of the Invention

The present invention generally relates to a method and apparatus for acoustic leak detection, and more particularly to an improved method and apparatus for quickly and accurately locating the source of a leak in a pipeline utilizing pattern match filtering techniques.

2. Related Art

In pressurized systems, such as pipelines, the pressure boundary is maintained by the pipe wall. The pipe wall has a yield stress greater than the stress exerted from the system pressure. At the instant of a breakdown of the pipe wall, the release of the elastic force couples with the system fluid to create a transient pressure wave. Since pressure is relieved (due to the break in the pipe wall) from the containment system, the transient pressure wave takes the form of an expansion wave. This expansion waves travel outward in all directions from the source at the speed of sound for that fluid. When the fluid is contained in a pipeline, the expansion waves are guided through the fluid by the walls of the pipe in either direction from the source of the break.

Real time acoustic pipeline leak detection requires placing permanent monitors on a pipeline for detecting expansion pressure waves associated with a sudden break down of the pressure boundary due to a rupture in the pipe wall. In the past, it was the amplitude of the signal that was of concern. The source of the pressure waves was located between monitors by recording the time when the expansion pressure wave arrived at the monitors. Using these times ($t_2$ and $t_1$), knowing the fluid sound velocity (V) and the length of pipe between monitors (D) the leak event could be located. As shown in the following equation where X is the leak event location (distance from sensor number 1):

$$X = D/2 + V(t_2 - t_1)/2$$

If this event was not located between the monitors, it was ignored as a false event. The problem encountered with this method is that multiple transients on the pipeline from normal operating procedures can produce pressure disturbances (similar to an expansion wave generated by leak event) which are located on the monitored segment of pipeline and thus cause false leak alarms. Previously, background noises were filtered out by various techniques such as moving average, repetitive filter, dynamic threshold and band pass filters. Although, these have successfully filtered out certain types of background noises, these techniques have little affect on other types of transient noises, such as noises from pumps, compressors, and valve operations. These transient noises oftentimes produced signals with amplitudes similar to the amplitudes of such signals produced by leaks. This has led to a high false alarm rate and reduced sensitivity.

Additionally, knowing the exact time of arrival of the expansion pressure wave at each monitor is critical for precisely locating the leak on the pipeline. Since each monitor must record the moment the expansion wave arrives at its location, it is critical that each monitor records time on the same part of the expansion pressure wavefront. The low frequency content of the expansion pressure wave produces a wavelength of from a few hundred meters to 100,000 meters or more. Because of the length of the wavefront and other factors, an uncertainty in the time tag between monitors occurs, which in the past has limited leak location accuracy to typically +/−500 or more meters out of 10,000 meters. This has led to the inability to accurately locate leaks.

Accordingly, what is needed, and has heretofore not been provided, is a method and apparatus for pipeline leak detection which can filter out transient noise and thereby decrease false alarms while providing increasing sensitivity and accuracy. Additionally, what is needed, as not heretofore been provided is a method and apparatus for accurately determining the time of occurance of a leak to aid in accurately locating the leak. Previous efforts in detecting and locating pipeline leaks include:

Previous efforts in this area include:

U.S. Pat. No. 3,760,280 to Covington, which discloses a method and apparatus for delaying an electrical signal. The electrical signal to be delayed is converted into a frequency modulated signal which is coupled to a digital memory device that operates in response to a control signal. The rate of the control signal and the capacity of the memory device determine the delay of the FM signal. The delayed FM signal is then demodulated back to its original format.

U.S. Pat. No. 3,903,729 to Covington, discloses a method and apparatus for detecting a break or other occurrence in a pipeline containing gas under pressure. This patent discloses detecting the adiabatic pressure wave generated in the gas by the break and propagated through the gas at the speed of sound. The location of the break is determined by the change of pressure with respect to time of the leading wedge of adiabatic pressure wave. Spaced pressure-electrical transducers are utilized to detect the compressional waves. Electronic circuitry is utilized to delay a selected one of the transduced electrical signals for a selective time interval to substantially eliminate the portion of the signal responsive to compressional wave traveling in the direction opposite the preselected direction.

U.S. Pat. No. 4,455,863 to Huebler, et al., discloses the sonic detection of gas leaks in underground pipes. The patent detects sound waves created by leaking gas using a sound transducer attached to an elongated probe inserted into the ground for a substantial portion of its length. The elongated probe and transducer combination has an effective mechanical resonant frequency equal to or below the electrical resonant frequency of the sound transducer. The passive sonic detection apparatus and process of this invention provides improved sensitivity for detection of sounds created by leaking gas and thereby more accurate pinpointing of the gas leak in an underground pipeline.

U.S. Pat. No. 5,101,774 to Marziale, et al., discloses an acoustic leak detection system. The system is monitored for leaks by an acoustic leak detection system responsive to atmospherically carried sound transmissions. Energy level amplitudes of respective analog electrical signals generated sequence multiplicity of microphones are converted in a rapid time sequence to a first electric pulse signal sequence represented of a corresponding digital values.

U.S. Pat. No. 5,201,212 to Williams, discloses a method and apparatus for testing underground fluid containing lines for leaks. The apparatus includes a differential pressure transducer mounted to a reservoir for indicating volumetric change in the reservoir, a temperature transducer mounted in the reservoir for monitoring temperature fluctuation in the reservoir, a gauge pressure transducer mounted in the reservoir, and a remote temperature sensor and data acquisition and processing system. Readings are taken and pressure and temperature fluctuations in the line are tested at 30 second intervals. Thereafter, the system calculates the leak rate during each 5 minute interval of the test, as well as a cumulative leak rate.

The present invention addresses the problems and limitations of the previous efforts of others by comparing not only the amplitude of signals, but also the wave shape, against previously recorded pipeline leak expansion waves generated by real leak events in pipelines both in the field and by experimental testing. The present invention provides a method and apparatus for filtering the undesirable transient wave signals, while detecting the expansion waves signals due to a break in the wall of the pipe. Additionally, the present invention provides a method and apparatus for specifically determining the time when a leak occurs so that it can be accurately located.

None of the previous efforts of others, taken either alone or in combination, teach or suggest all of the elements of the present invention, nor the advantages and benefits of the present invention.

OBJECTS AND SUMMARY OF THE INVENTION

It is a primary object of the present invention to provide a method and apparatus for detecting and locating leaks in pipelines which has increased sensitivity and increased accuracy.

It is an additional object of the present invention to provide a method and apparatus for detecting and locating leaks in pipelines which reduces false alarms.

It is even an additional object of the present invention to provide a method and apparatus for detecting and locating leaks in pipelines which uses pattern match filtering.

It is still even an additional object of the present invention to provide a method and apparatus for detecting and locating leaks in pipelines which uses pattern match filtering to discriminate against background noise and pressure disturbances generated by other non-leak sources.

It is yet an additional object of the present invention to provide a method and apparatus for detecting and locating leaks in pipelines which continuously compares previously recorded leak profile data with current pipeline data collected in real time to detect leaks in the pipeline.

It is even yet an additional object of the present invention to provide a method and apparatus for detecting and locating leaks in pipelines by deriving the sharp peaked output of pattern match filter associated with a leak signal to provide a distinctive reference point for use as a time stamp for improving accuracy in leak location calculations.

It is still a further object of the present invention to provide a method and apparatus for detecting and locating leaks in pipelines which utilizes site processors located along a pipeline for making comparisons, and which also utilizes node processors to make further comparisons to thereby further reduce false alarms.

A method and apparatus is provided for detecting and locating leaks in a pipeline. Pattern match filtering is used to reduce false alarm rate, increase sensitivity and improve leak location accuracy, while quickly detecting leaks by the acoustic signal generated from a leak event in pipelines containing either gas or liquid or both (two phase flow) under pressure. The pattern match filter technique detects a pressure wave generated by a leak, but discriminates against background low noise and pressure disturbance generated by other non-leak sources that might otherwise be detected as a leak. The pattern match filter derives a distinctive point of reference from the signal of the expansion wave which allows for an accurate time stamp. This provides for improved accuracy in leak location calculations. The pattern match filter is incorporated into site processors located at multiple points along a pipeline, and at a central node processor which receives data from all site processors. The pattern match filter includes using previously recorded leak profiles. At site processes located at multiple points along a pipeline, a series of previously recorded signature leak profiles are continuously compared in real time against pipeline pressure signals. Data from each site processor are used collectively at a node processor and compared against multiple leak profiles to provide further false alarm rejection. The leak event data generated at each site processor is used by the node processor to declare a leak. By the application of this pattern match filter technique, the signal to noise ratio (S/N ratio) required to identify a leak event is reduced and the sensitivity of leak detection is increased.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Figure 1:
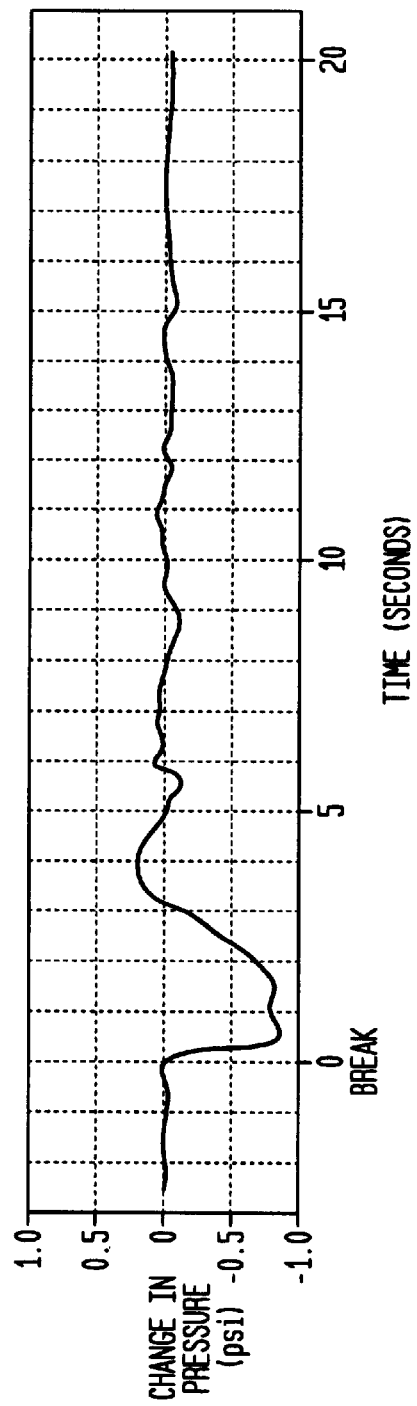
FIG. 1 is a graph of a typical signal in real time showing the changes in the pressure of a static gas or liquid contained in a pipeline at the point of a break in the pipeline.

The present invention comprises a method and apparatus for real time acoustic pipeline leak detection and location for detecting and locating leaks quickly to provide a means of limiting total product loss and preventing catastrophic accident. The filters of the present invention are directed to address the problems that occurred in the past by comparing not only the amplitude, the rate of decay, but also the wave shape against previously recorded pipeline leak expansion wave profiles under various operational conditions as well as different degrees of dispersion. This aggressive (or active) filtering concept is used to incorporate signature (or mask)

signal profile from a data base developed from actual leak data collected from both field and experimental tests. The results of the cross correlation between the signature signal and the leak signal creates a sharp peaked output which enhances the consistency of time tagging between different monitors and improves the leak location accuracy. The techniques of the present invention have proven to reduce false alarm rates substantially and enhance the reliability of the on-line acoustic leak detection systems drastically. Leak detection systems using the method and apparatus of the present invention may also benefit from an increased sensitivity to leak signals. Since a signal which does not match the previously recorded leak signals will produce a small output (as compared to a matched signal), the signal to noise ratio is significantly improved.

A leak caused by wall failure of a pipeline under pressure is a sudden event which occurs when the internal pressure produces a sudden rupture in a pipe wall. When the hole forms, fluid escapes in the form of a high velocity jet. The breakdown of the pressure boundary leads to a new equilibrium state and produces a sudden pressure drop in the system which propagates in both directions as acoustic signals within the pipeline with the following characteristics:

1. The low frequency acoustic signal travels over large distances within the pipeline due to low signal attenuation loss and because the pipe walls guide the wavefronts.
2. Signals propagate in the fluid at the speed of sound.
3. Pressure loss is detectable as an acoustic signal.
4. The amplitude of the acoustic signal increases with leak size and system pressure.
5. The signal dissipates due to kinetic and frictional energy losses.
6. The signal disperses due to the fact that different frequency components tend to spread out in time when propagating along the pipeline.

Real time acoustic pipeline leak detection systems make use of these characteristics to provide the following information:

1. That a leak has occurred.
2. Where the leak is located.
3. At any particular point of time (from leak occurance) every leak has a characteristic profile which can be used to distinguish a true leak from other background noise and pressure disturbance.

Analog pressure signals are monitored directly by local site processors. The 4–20 mA signal is converted to a voltage signal. This voltage signal is isolated electrically, filtered to remove out-of-band noise and split into a DC coupled (quasi) signal represents static pipeline pressure signal and an AC coupled signal representing acoustic pressure. Signals are multiplexed to an Analog to Digital Converter and sampled to a dedicated high speed digital processor.

The digital processor continuously compares the acoustic pressure with mask profiles representing the characteristic acoustic signal profile of a high pressure leak under the corresponding operation conditions. Digital band-pass, repetitive and moving average filters are used to discriminate against out of band noise.

Results of the analysis performed by the site processors are summarized in the form of digitized parameters, the leak profile and digital flags which are sent to the node processor. The node processor compares leak profiles from all site processors and time stamp data to determine if a leak has occurred on the pipeline.

Figure 2:
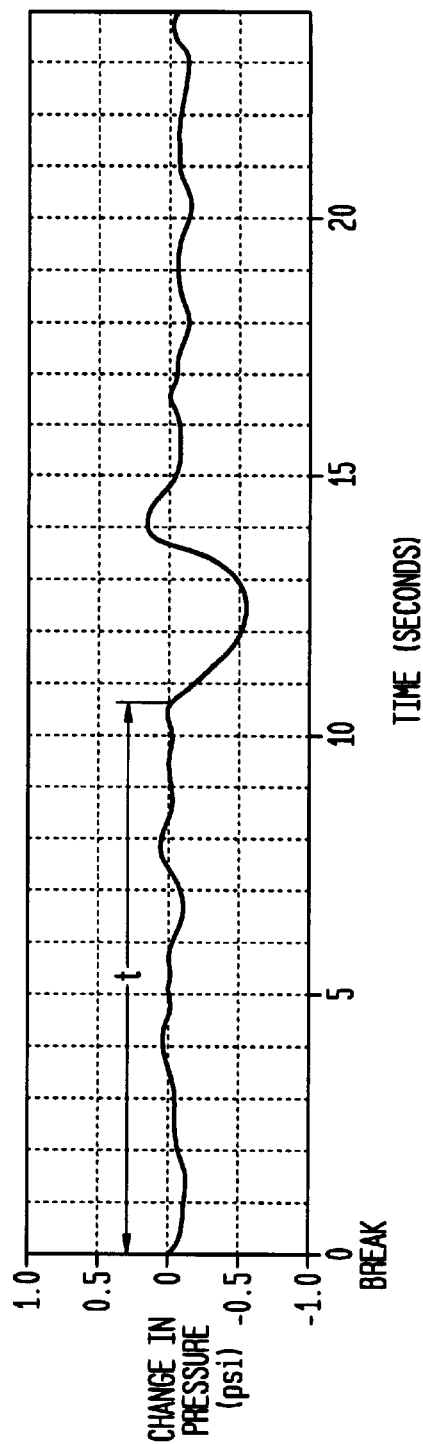
FIG. 2 is a graph of the changes in the pressure over time of propagation for a static gas or liquid contained in a pipeline at some point distant from a break in the pipeline.

FIGS. 1 and 2 illustrate graphically with respect to time, the changes in the pressure of a fluid, whether liquid or gas, contained in a pipeline at the point of a leak in the pipeline. It is assumed for purposes of these illustrations that the fluid is static, that is, there are no transient changes in the pressure ("noise") of the fluid caused by pumps, compressors, etc. FIG. 1 illustrates the pressure in the fluid at the point of a break in the pipeline. Immediately after the break occurs there is a rapid and significant decrease in the pressure of the fluid. FIG. 2 illustrates the changes in the pressure of a fluid contained in a pipeline at some distance from the leak. At some point in time after the break occurs, the pressure of the liquid begins to decrease from the operating pressure. The time interval (t) before the pressure begins to decrease depends on the speed of sound in the fluid and the distance between the leak and the point at which the pressure of the fluid is being monitored. The decrease in the pressure of the fluid with respect to time (the dp/dt or slope of the pressure drop) is a function of the fluid properties and is proportional to the distance from the leak.

Figure 3:
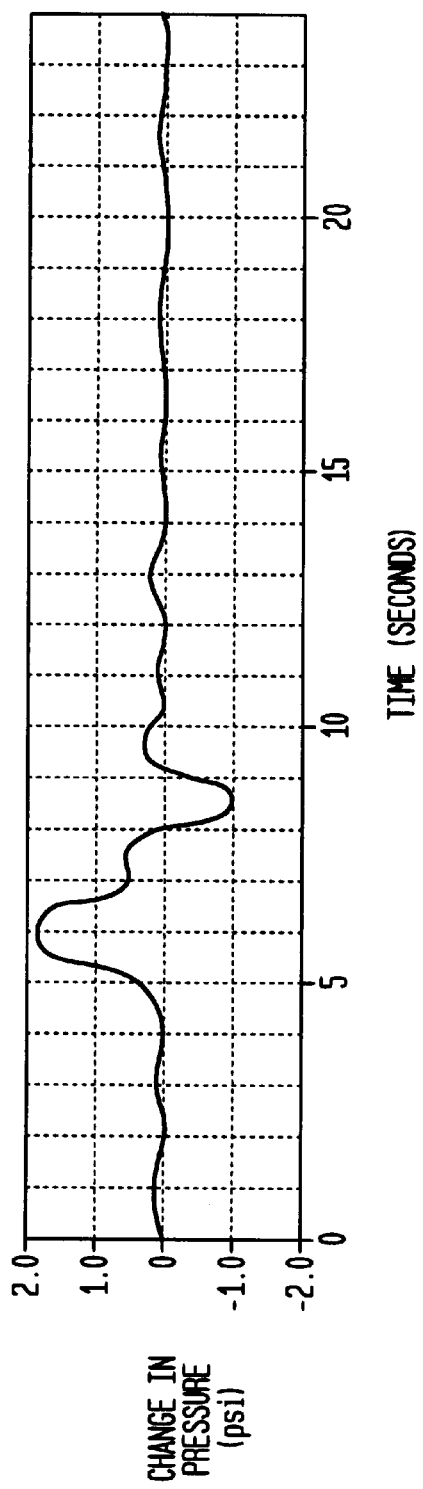
FIG. 3 is a graph of the changes in the pressure of a liquid over time contained in a pipeline near the output of a pump during the time when the pump was started.
Figure 4:
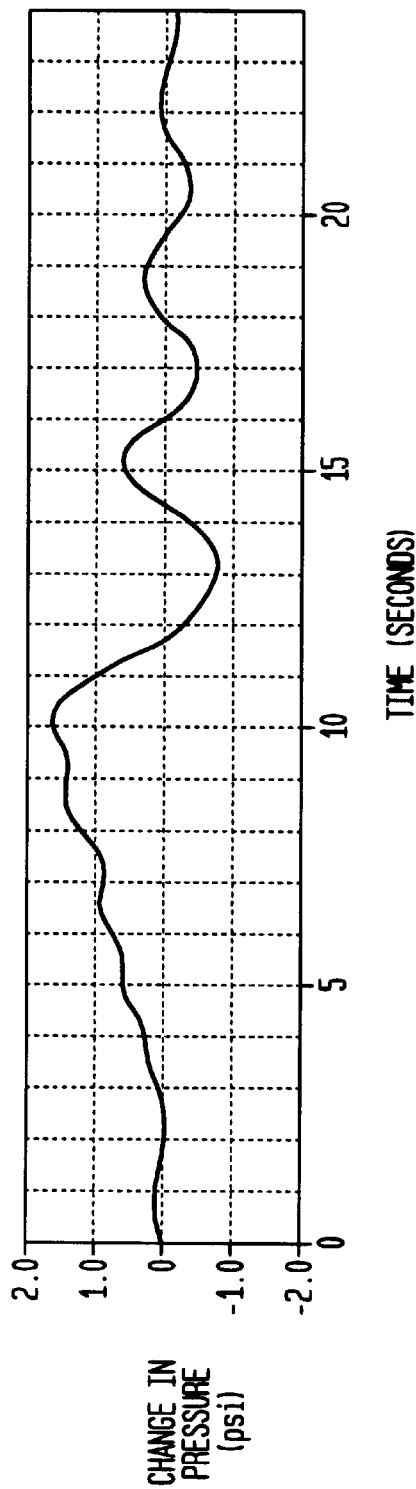
FIG. 4 is a graph of the changes in the pressure of a liquid over time contained in a pipeline downstream from a gate valve during the time when it was being opened.

FIGS. 3 and 4 graphically illustrate with respect to time, changes in a fluid contained in a pipeline because of transient changes. FIG. 3 shows the changes in the pressure of a liquid contained in a pipeline near the output of a pump when the pump was started. FIG. 4 shows the changes in the pressure of a liquid contained in a pipeline downstream from a gate valve as it was being opened. In both cases the noise source is producing transient pressure changes in the range of several psi per second. It can be observed that an expansion wave (due to a break in the pipe wall) producing a pressure decrease of 1 psi or less per second could be indistinguishable from this pumping noise if analyzed strictly from a wave amplitude point of view. Indeed, such an analysis would yield a false alarm.

In many cases a pipeline may have several sources of similar noise or on a short pipeline a single source of noise would reflect from the ends of the pipe. In these cases the prior art methods and apparatus utilized to monitor the pressure of a fluid experiencing noise as illustrated in FIGS. 3 and 4 would not be able to distinguish an expansion wave due to a break from the noise present on the pipeline. However, as shown in FIGS. 3 and 4, the pressure transient pattern (pressure increase followed by pressure decrease) is extremely different from the pressure transient pattern from a leak event. Therefore, it is rather easy for the pattern match filter of the present invention to distinguish a true leak from other types of transient events. Thus, present invention provides a method to distinguish an expansion wave due to a leak from other noise sources on a pipeline. This not only reduces the false alarm rate but also increases the sensitivity and improves the leak location accuracy.

Figure 5:
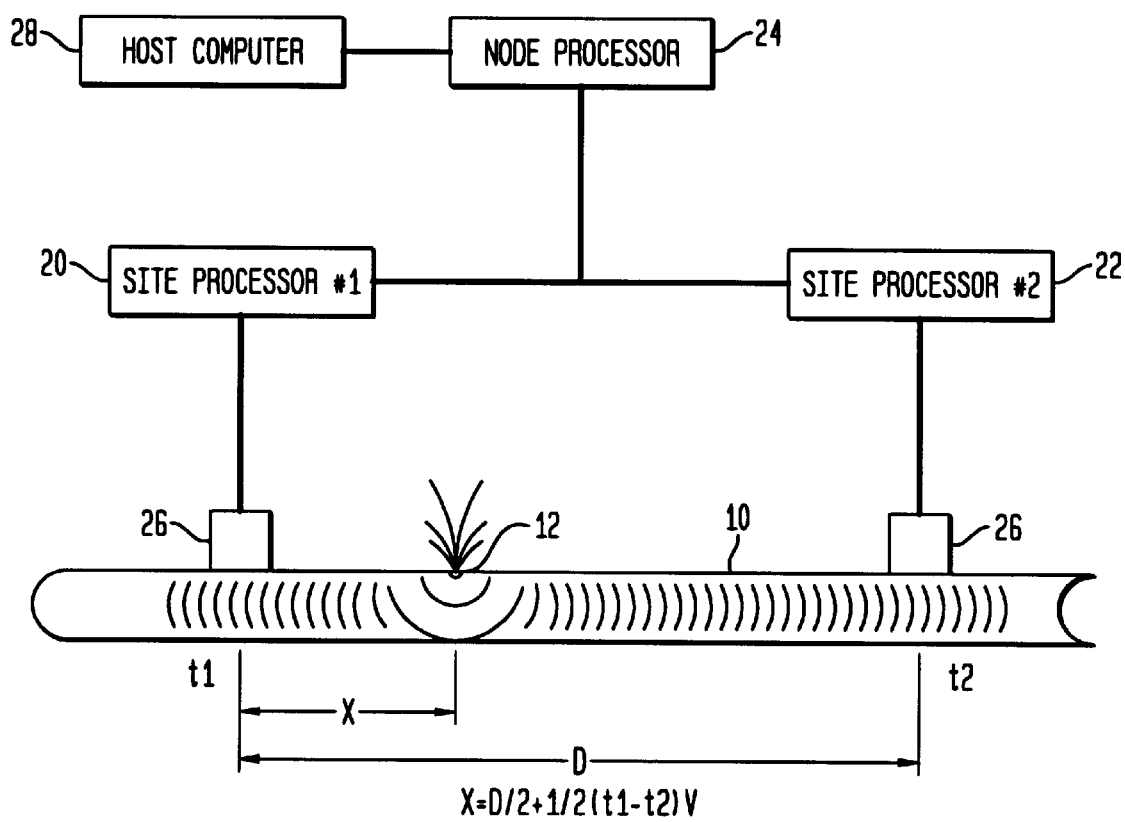
FIG. 5 is a schematic view of an embodiment of the real time leak detection and location system of the present invention, including site processors and a node processor.

FIG. 5 schematically shows an embodiment of the apparatus of the present invention for real time leak detection of leaks in a pipeline 10. The system configuration includes site processors 20 and 22 and node processor 24. The present invention employs site processors at intervals along the pipeline. Each site processor 20, 22, receives input from one or more acoustic sensors 26, preferably 4–20 mA, positioned along pipeline 10. The sensor element is preferably a piezo-resistive pressure transmitter with a frequency response from DC (0 Hz) to above 100 Hz. The site processors 20, 22, communicate with and are controlled by node processor 24. The site processors 20, 22, monitor the pressure in real time and perform initial local filtering. The site processors 20, 22, consist of multiple stages of analog and digital filters. Once the site processors 20, 22, detect a potential leak, the information is sent back to the node processor 24 for further processing. A leak 12 is declared by the node processor 24 if, after filtering all site processor data, the node processor 24 is able to locate a leak from two or more sets of site processor data, and logically accepts the leak location from the site processor data. Leak information including leak location is output by the node processor 24 to a host computer 28 equipped with SCADA (Supervisory Control and Data Acquisition) software, such as that from Intellution.

Figure 6:
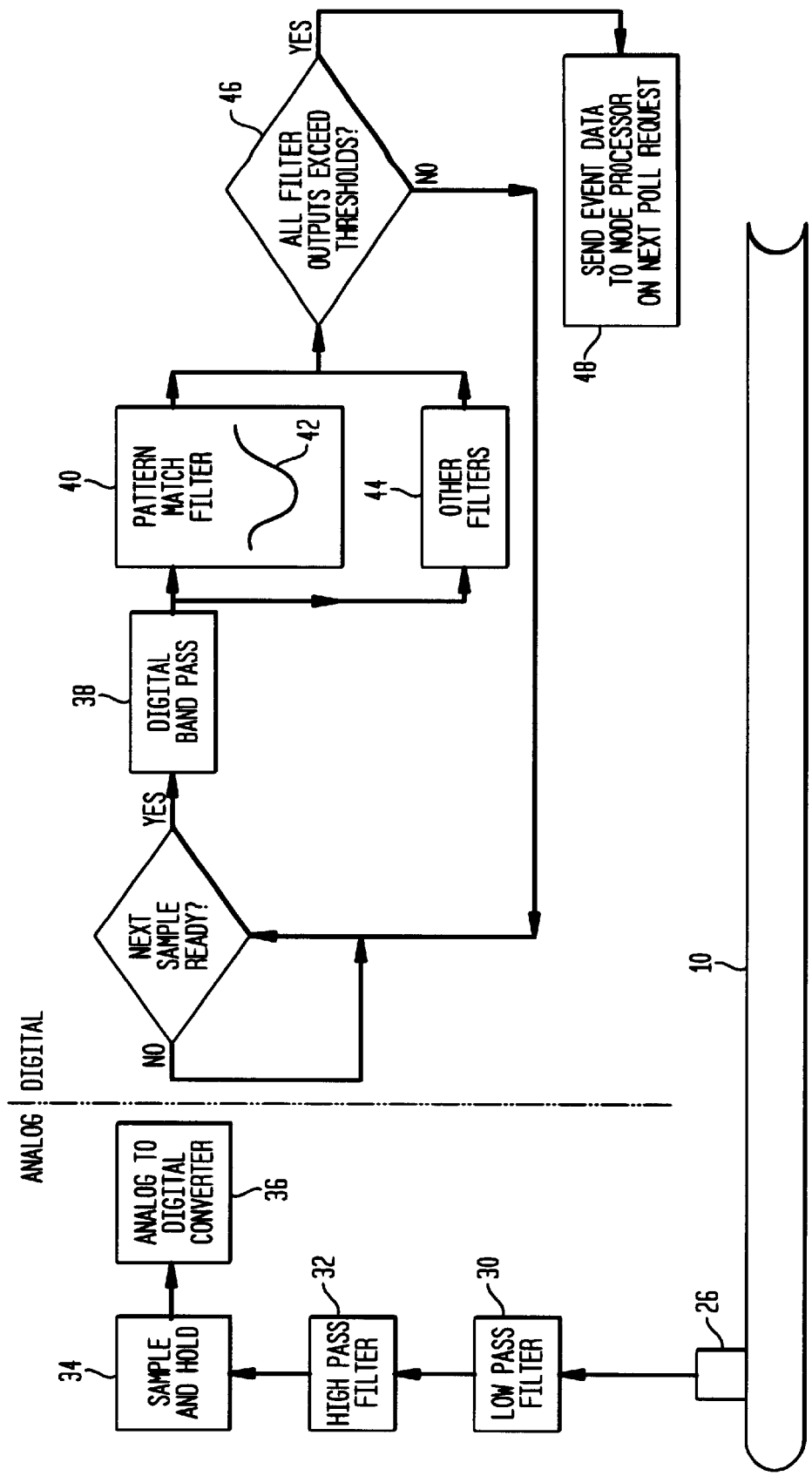
FIG. 6 is a flow chart of the signal in the site processor shown in FIG. 5.

FIG. 6 illustrates the signal flow in site processor 20. The acoustic pressure input signal from the sensor elements 26 is first passed through two analog filters, a low pass filter 30, and a high pass filter 32, designed to pass signals of the frequency range of interest. In a preferred embodiment, the low pass filter 30 has a 28 dB/octave roll off, while the high pass filter 32 has a 12 db/octave roll off. The pressure input signal is sampled 34 and passed through a digital to analog converter 36. The digital signal is passed through a digital band pass filter 38. The sampled signal is continuously compared by pattern match filter 40 to the recorded digitized pattern representing a typical leak signal profile 42. The digitized pattern representing a typical leak signal profile 42 was developed from a database of information accumulated from field test data and experimental leak tests. This experimental and field test data includes profiles recorded from simulated leak tests done on existing pipelines on which the acoustic leak detection system has been installed and from simulated leak tests done in a laboratory environment. This data was accumulated by placing pressure sensors along a pipeline for collecting analog signals, which were digitized and stored on portable personal computers. A plurality of computers were used, one at each site, to collect simultaneous data at different points on a pipeline from a single leak event. The signal is passed through other filters 44 in parallel. If the output of all filters exceed their thresholds as determined by the dynamic threshold mechanism 46, the leak information is sent to the node processor 48.

Comparison of the digitized signal and the previously recorded signal by the pattern match filter 40 is performed as follows: Let $\otimes$ denote a cross-correlation, let f(t) denote the real time acoustic pressure profile and g(t) the digitized leak signature signal pattern for the particular pipeline, fluid and operating condition, then the cross-correlation of the two functions f(t) and g(t) of a real variable t is defined by: f $\otimes$ g=Σf(t)×g(t).

A close match between the real time acoustic pressure profile and the digitized signature pattern would result in a sharp increase at the output of the pattern match filter 40. Conversely a poor match would result in a near zero minimal signal. If the output exceeds the threshold value, a digital event flag is set. The pattern match filter threshold is incorporated into the existing threshold mechanism 46 as one of the criteria in determining the occurrence of the leak. This will substantially reduce the false alarm rate. If the digital flags are set simultaneously by all criteria in the threshold mechanism 46, the site processor declares that an acoustic event has occurred.

Figure 7A:
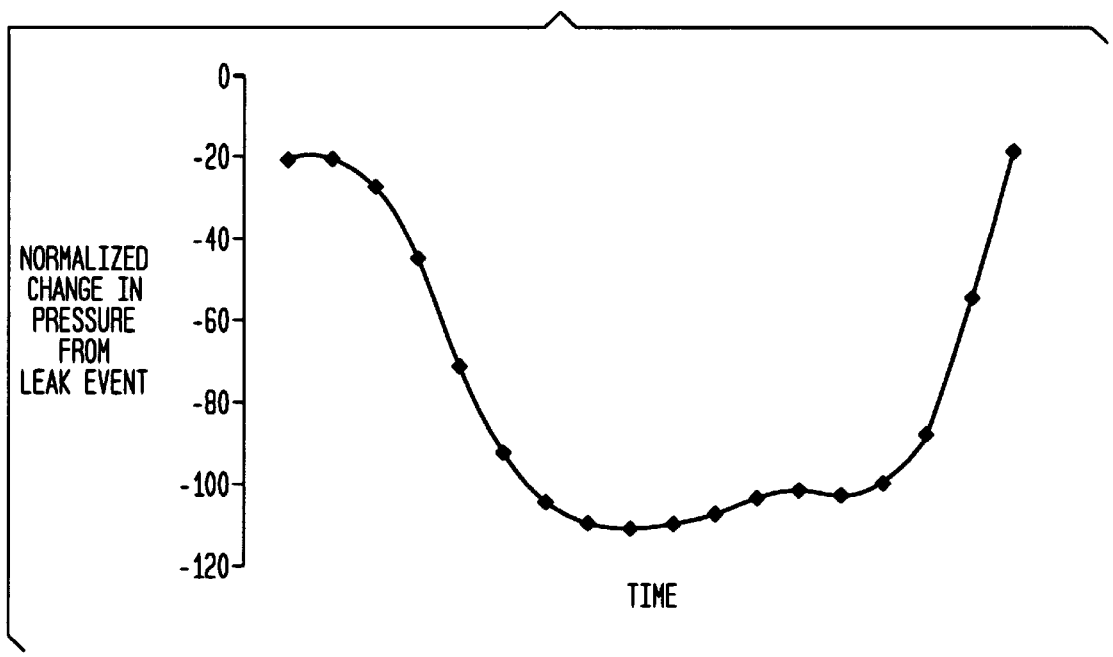
FIG. 7a is a graph of an example of Mask (signature) signal and FIG. 7b is a graph of the match signal output over time due to a break in the pipeline.
Figure 7B:
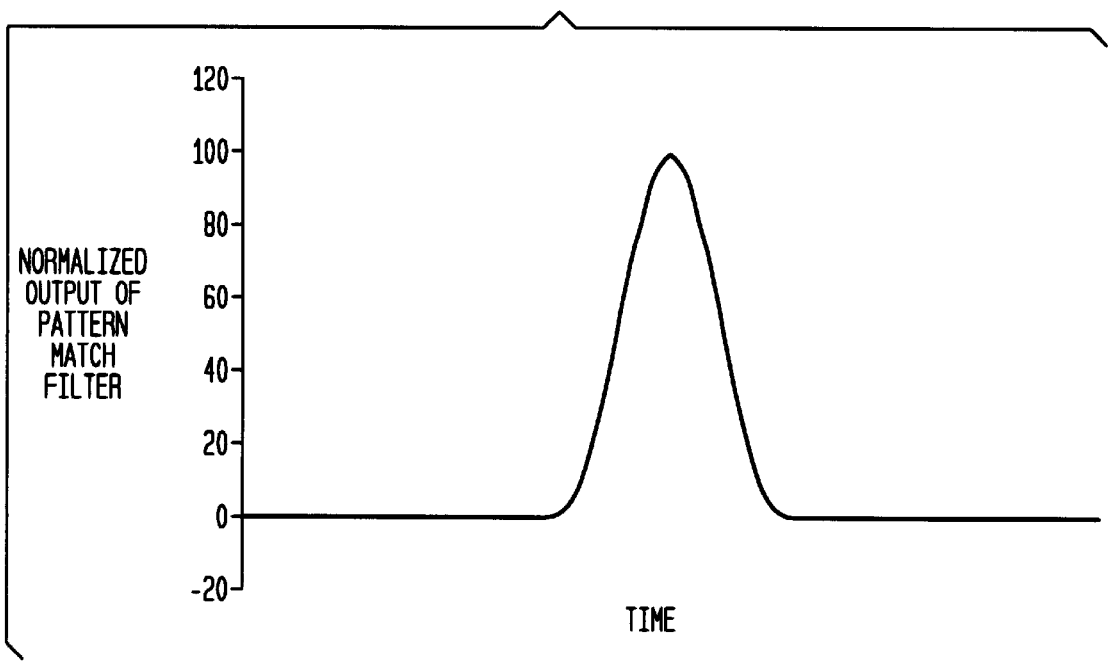

FIGS. 7a and 7b illustrate graphically with respect to time, the normalized change in pressure from a leak (FIG. 7a), and the match signal output (FIG. 7b) due to a break in the pipeline. As shown in these two FIGS., the output from the pattern match filter (FIG. 7b) has a much sharper peak than the original leak signal (FIG. 7a). This allows for a much more accurate time stamp among different site processors. Knowing the exact time of arrival of the expansion pressure wave at each monitor is critical for precisely locating the leak on the pipeline. Since each monitor must record the moment the expansion wave arrives at its location, it is critical that each monitor records time on the same part of the expansion pressure wavefront. An additional benefit of the pattern match filter of the present invention is the sharp peaked output of the signal when a leak signal match occurs. This type of output provides for a clear and distinctive point of reference for a time stamp which is relatively consistent from site to site for the same leak wave front. This serves to improve the accuracy of leak location calculation drastically.

The site processors 20, 22, set a time stamp from their internal clocks and generate appropriate digital communications messages which include the recorded real time acoustic pressure profile that closely matches the digitized pattern representing a typical leak signal profile. The amplitude of the recorded real time acoustic pressure profile is normalized. The normalized profile will enable the node processor 24 to compare profiles from different site processors 20, 22, independent of signal amplitude differences. All information is sent from the site processors 20, 22, to the node processor 24 for further analysis.

Figure 8:
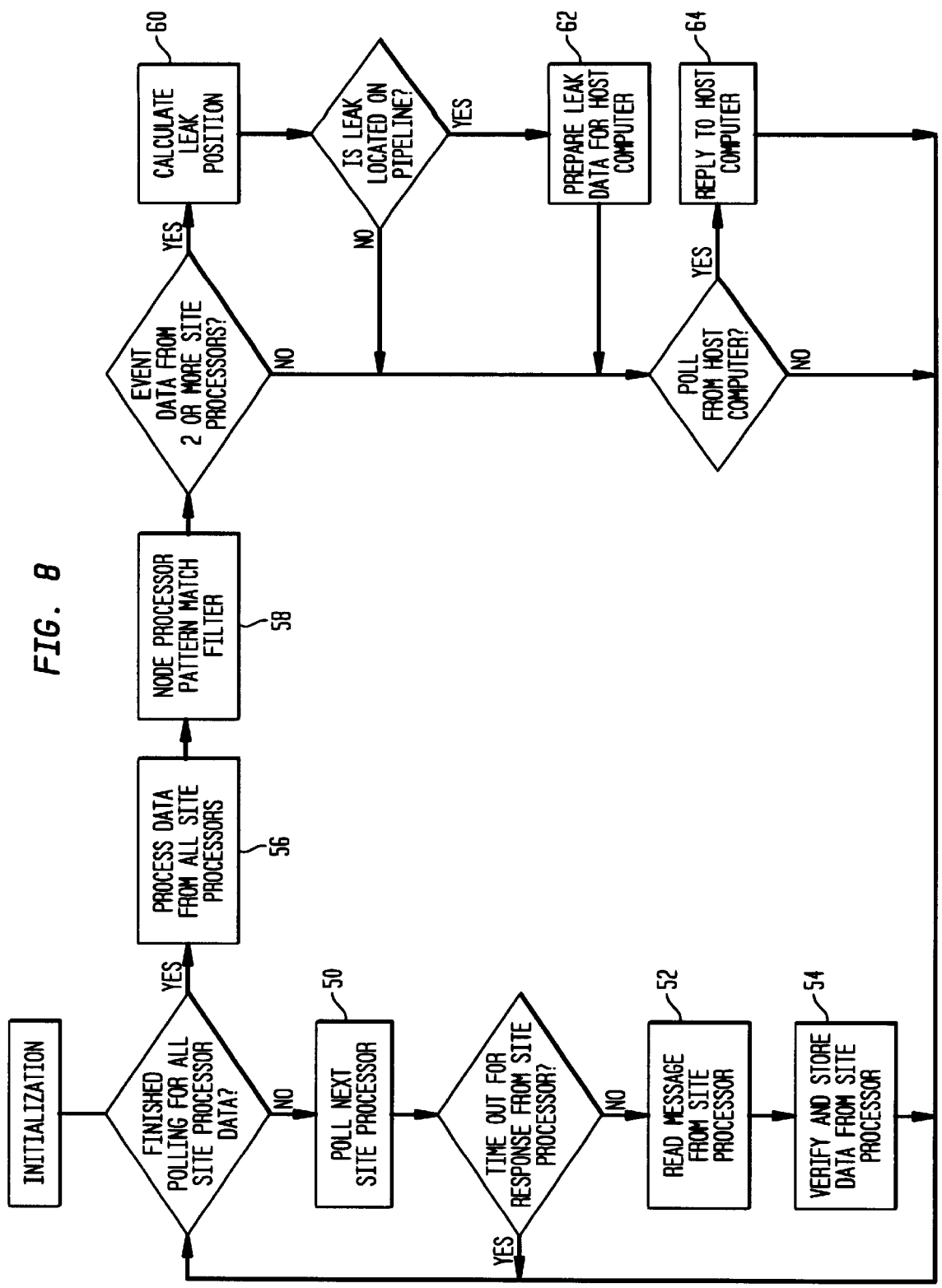
FIG. 8 is a flow chart of the signal in the node processor shown in FIG. 5.

The node processor 24 monitors and controls site processors 20,22. Referring to FIG. 8, the node processor 24 originates requests for information from subsidiary site processors 20, 22, by transmitting polling messages 50. When a site processor 20, 22, detects a potential leak signal, information including the recorded real time acoustic pressure profile that closely matches the digitized pattern representing a typical leak signal profile is sent to the node processor 24. The node processor 24 receives, integrates and analyses 52 the data from site processors 20, 22. The analysis performed by node processor 24 is initiated in response to an alarm generated by site processors 20, 22 and transmitted to node processor 24. It creates an event file 54 in RAM which is a record of current acoustic event data from site processors including the leak profile.

The node processor 24 contains a complete database of digitized profiles. These digitized profiles (signature or mask profiles) were recorded from simulated leak tests done on existing pipelines on which the acoustic leak detection system of the present invention has been installed and from simulated leak tests done in a laboratory environment. The digitized profiles were recorded under different conditions, including but not limited to various pressures, temperatures, distances from the leak source, flow rates, fluids, pipe diameters, as well as different degrees of propagation for dissipation and dispersion adjustments. From the monitored pipeline operating conditions, a combination of these profiles are chosen for comparison against the recorded real time acoustic pressure profiles sent by the site processor. This allows for improved false alarm discrimination for varying pipeline conditions while maintaining maximum leak sensitivity.

For a node processor to declare a leak, an event from two site processors must be located on the pipeline. The node processor 24 processes data from all site processors 56. Leak location is determined by the node processor based upon times of arrival of acoustic signals at pressure transducers located along pipeline. The different arrival times of an acoustic leak signal at respective processor sites are represented by a difference in two site processor clock times. This information along with knowledge of the propagation velocity of the transient wave is sufficient for computation of leak location. The node processor 24 then does a pattern match filter 58. Once a pair of events passes all of the filters both at the site processors and at the node processor, and are located on the pipeline, then the node processor declares a leak and calculates the leak position 60. Node processor 24 also transmits an alarm signal which may be received by a computer terminal after a leak has been declared.

System information is output 62, 64, by the node processor to host computer 28 equipped with SCADA software. SCADA software provides operator interface along with database management and report generation. In addition, it issues alarms as required.

Having thus described the invention in detail, it is to be understood that the foregoing description is not intended to limit the spirit and scope thereof. What is desired to be protected by Letters Patent is set forth in the appended claims.

What is claimed is:

1. A method for detecting leaks in pipelines comprising the steps of:

interconnecting sensors at a plurality of locations along a pipeline for sensing fluid acoustic pressure in the pipeline at the plurality of locations;

interconnecting local site processors with the sensors at the plurality locations along the pipeline;

obtaining past fluid acoustic pressure data associated with past leaks in pipelines;

storing the past fluid acoustic pressure data associated with past leaks in the local site processors;

sensing fluid acoustic pressure in the pipeline at the plurality of locations with the sensors;

comparing the sensed fluid acoustic pressure data with the past fluid acoustic pressure data in the local site processors; and issuing an alarm if the sensed fluid acoustic pressure data matches the past fluid acoustic pressure data.

2. The method of claim 1 wherein the step of comparing the sensed fluid acoustic pressure data with the past fluid acoustic pressure data is conducted over a plurality of data points.

3. The method of claim 1 wherein the step of comparing the sensed fluid acoustic pressure data with the past fluid acoustic pressure data is performed by comparing amplitude, rate of decay and wave shape.

4. The method of claim 1 wherein the step of comparing the sensed fluid acoustic pressure data with the past fluid acoustic pressure data is performed by pattern match filtering.

5. The method of claim 1 further comprising interconnecting the local site processors with a node processor and storing past fluid acoustic pressure data associated with past leaks in the node processor, and comparing the sensed fluid acoustic pressure data and the past fluid acoustic pressure data in the node processor in response to an alarm issued by the local site processors.

6. The method of claim 5 further comprising transmitting the alarm signal from the node processor to a computer terminal when the comparisons from a plurality of site processors indicate that the sensed fluid acoustic pressure data matches the past fluid acoustic pressure data.

7. The method of claim 6 further comprising locating a leak in the pipeline by time stamping data for recording the time of an acoustic pressure profile at a plurality of sites, and calculating the leak location based on the time and velocity of sound in a fluid in the pipeline.

8. The method of claim 6 further comprising sensing fluid acoustic pressure data using low-frequency signals.

9. The method of claim 6 further comprising sensing fluid acoustic pressure data using low sample rates.

10. The method of claim 6 wherein two or more local site processors are interconnected with a node processor and the method further comprises confirming leaks by the node processor upon detection of a leak by at least two of the site processors.

* * * * *